(12) United States Patent
Kemper et al.

(10) Patent No.: US 7,958,030 B2
(45) Date of Patent: Jun. 7, 2011

(54) SYSTEM AND METHOD FOR ISSUER ORIGINATED PAYMENTS FOR ON-LINE BANKING BILL PAYMENTS

(75) Inventors: Lynn Kemper, Portland, OR (US); Barbara Patterson, South San Francisco, CA (US); Kimberly Lawrence, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 546 days.

(21) Appl. No.: 11/217,691

(22) Filed: Aug. 31, 2005

(65) Prior Publication Data

US 2006/0080243 A1    Apr. 13, 2006

Related U.S. Application Data

(60) Provisional application No. 60/606,594, filed on Sep. 1, 2004.

(51) Int. Cl.
*G06Q 40/00* (2006.01)

(52) U.S. Cl. ........................................... 705/35; 705/40
(58) Field of Classification Search .................... 705/35, 705/40

See application file for complete search history.

(56) References Cited

U.S. PATENT DOCUMENTS

| | | | |
|---|---|---|---|
| 5,220,501 A | 6/1993 | Lawlor et al. | |
| 5,465,206 A | 11/1995 | Hilt | |
| 5,884,290 A | 3/1999 | Smorodinsky et al. | |
| 5,920,847 A | 7/1999 | Kolling et al. | |
| 5,970,475 A | 10/1999 | Barnes et al. | |
| 6,035,285 A | 3/2000 | Schlect et al. | |
| 6,324,525 B1 * | 11/2001 | Kramer et al. | 705/40 |
| 6,493,685 B1 | 12/2002 | Ensel et al. | |
| 6,609,113 B1 | 8/2003 | O'Leary et al. | |
| 6,618,705 B1 | 9/2003 | Wang et al. | |

(Continued)

FOREIGN PATENT DOCUMENTS

EP    2 088 549 A1    12/2009

(Continued)

OTHER PUBLICATIONS

Stoneman, Bill; "Bridging the Maze"; 2005, BAI, Banking Strategies, http://www.bai.org/bankingstrategies/2003-jul-aug/bridging/index.asp., 4 pages.

*Primary Examiner* — Jason M Borlinghaus
*Assistant Examiner* — Samica L Norman
(74) *Attorney, Agent, or Firm* — Kilpatrick Townsend & Stockton LLP (57) ABSTRACT

Techniques for processing on-line banking bill payment requests are provided. A bill payment request is received from an operator of an on-line banking bill payment web site. The operator may be a bank. The request is for payment of a bill using a portable consumer device. A transaction request is then generated for an issuer and sent to the issuer for authorization. The issuer then sends a response indicating whether the transaction request is approved or declined. Remittance information for a biller is generated if the transaction is approved. The remittance information is then forwarded to the operator of the on-line banking bill payment web site for forwarding to a user of the portable consumer device. Additionally, the remittance information is sent to an acquirer or cash management bank, which can forward the information to the biller associated with the bill payment request.

24 Claims, 3 Drawing Sheets

U.S. PATENT DOCUMENTS

| | | | |
|---|---|---|---|
| 6,704,714 | B1 | 3/2004 | O'Leary et al. |
| 6,847,953 | B2 | 1/2005 | Kuo |
| 7,089,208 | B1 | 8/2006 | Levchin et al. |
| 7,207,479 | B2 | 4/2007 | Moreau, Jr. et al. |
| 7,251,656 | B2 | 7/2007 | Keown et al. |
| 7,606,787 | B2 | 10/2009 | Keown et al. |
| 7,676,431 | B2 | 3/2010 | O'Leary et al. |
| 2001/0037295 | A1* | 11/2001 | Olsen ............................. 705/40 |
| 2002/0077978 | A1 | 6/2002 | O'Leary et al. |
| 2002/0128981 | A1 | 9/2002 | Kawa et al. |
| 2003/0055756 | A1 | 3/2003 | Allan |
| 2003/0120608 | A1 | 6/2003 | Pereyra |
| 2003/0140004 | A1 | 7/2003 | O'Leary et al. |
| 2003/0144935 | A1 | 7/2003 | Sobek |
| 2003/0191711 | A1* | 10/2003 | Jamison et al. ................ 705/40 |
| 2003/0204457 | A1 | 10/2003 | Arias |
| 2004/0049458 | A1 | 3/2004 | Kunugi et al. |
| 2004/0078328 | A1 | 4/2004 | Talbert et al. |
| 2004/0122766 | A1* | 6/2004 | Brooks et al. .................. 705/40 |
| 2004/0230527 | A1 | 11/2004 | Hansen et al. |
| 2004/0230539 | A1 | 11/2004 | Praisner |
| 2005/0080728 | A1 | 4/2005 | Sobek |
| 2005/0119978 | A1 | 6/2005 | Ates |
| 2005/0177510 | A1 | 8/2005 | Hilt et al. |
| 2005/0240526 | A1 | 10/2005 | Hill |
| 2006/0085337 | A1* | 4/2006 | Conforti et al. ................ 705/40 |
| 2006/0273155 | A1 | 12/2006 | Thackston |
| 2007/0100770 | A1 | 5/2007 | Grinberg et al. |
| 2007/0282743 | A1 | 12/2007 | Lovelett et al. |
| 2008/0133408 | A1 | 6/2008 | Nakfoor |
| 2008/0172344 | A1 | 7/2008 | Eager et al. |
| 2009/0072020 | A1 | 3/2009 | Hull |
| 2009/0089211 | A1 | 4/2009 | Morse |
| 2009/0106152 | A1 | 4/2009 | Dill et al. |
| 2009/0171845 | A1 | 7/2009 | Powell |
| 2009/0182654 | A1 | 7/2009 | Mullen et al. |
| 2009/0198615 | A1 | 8/2009 | Emerson et al. |
| 2009/0240626 | A1 | 9/2009 | Hasson et al. |
| 2010/0057552 | A1 | 3/2010 | O'Leary et al. |

FOREIGN PATENT DOCUMENTS

| | | |
|---|---|---|
| WO | WO 00/04515 A1 | 1/2000 |
| WO | WO 00/30051 A1 | 5/2000 |
| WO | WO 00/67220 A1 | 11/2000 |
| WO | WO 01/99019 A1 | 12/2001 |
| WO | WO 03/073389 A2 | 9/2003 |
| WO | WO 2004/114168 A1 | 12/2004 |
| WO | WO 2007/137283 A2 | 11/2007 |
| WO | WO 2007/144708 A1 | 12/2007 |
| WO | WO 2009/051937 A1 | 4/2009 |
| WO | WO 2009/085387 A1 | 7/2009 |
| WO | WO 2009/088372 A1 | 7/2009 |

* cited by examiner

SYSTEM AND METHOD FOR ISSUER ORIGINATED PAYMENTS FOR ON-LINE BANKING BILL PAYMENTS

CROSS-REFERENCES TO RELATED APPLICATIONS

This application claims priority from U.S. Provisional Patent Application No. 60/606,594, filed Sep. 1, 2004, entitled "System and Method for Issuer Originated Payments for On-line Bill Payments", which is hereby incorporated by reference, as if set forth in full in this document, for all purposes.

BACKGROUND OF THE INVENTION

Embodiments of the present invention generally relate to commercial transactions and more specifically to systems and methods for processing transactions for on-line banking bill payment using a portable consumer device.

On-line banking bill payment is a convenient way for users to pay bills. A user can use a biller's web site to pay a bill using a portable consumer device. This, however, requires that a user use the biller's web site. When a user has multiple bills to pay, the process of going to each biller's web site may be tedious and time consuming.

Banks have developed on-line banking bill payment web sites to consolidate paying bills. On-line banking bill payment eliminates paper work for all parties involved and also drives users to a bank's web site. Thus, a bank's web site may become more valuable in that marketing on the web site reaches more users in addition to generating revenue from advertisers on the web site.

Typically, an on-line banking bill payment web site allows the user to enter an amount to pay to a biller. The web site then uses an automated clearing house (ACH), wire transfer, or check to generate a payment to the biller. These methods require a user to have a deposit account, such as a checking account, from which money can be used to fund a payment to the biller. Users are thus restricted to these types of payments.

Users, however, may want to pay their bills using a portable consumer device. The portable consumer device process is typically initiated by a merchant (or biller.) For example, a merchant (biller) initiates a payment request for the amount of the bill. The transaction is then routed through the merchants' acquirer/processor, through a payment network (e.g., Visa or MasterCard) to an issuer for approval. The approved transaction is then settled, with the acquirer sending payment to the merchant. On-line banking bill payment is initiated through the on-line bank (or portable consumer device issuer). Thus, on-line banking bill payment being initiated by the biller is not possible.

Banks may allow a user to initiate a bill payment through an on-line banking bill payment site using a portable consumer device. However, currently the bank acts as the issuer and the merchant together in order to allow the transaction. For example, the bank can use a cash advance or balance transfer transaction to credit the user's portable consumer device account for the bill payment amount. Then, the bank uses an ACH transaction to settle the payment to the biller. The bank in this case avoids using an acquirer and requires multiple separate transactions to satisfy the user's on-line banking bill payment request (e.g., a cash advance transaction and a separate ACH transaction). This transaction is not processed like a portable consumer device transaction and complicates the bill payment process.

BRIEF SUMMARY OF THE INVENTION

Embodiments of the present invention generally relate to processing on-line banking bill payment requests. In one embodiment, a bill payment request is received from an operator of an on-line banking bill payment web site. The operator may be a bank. The request is for payment of a bill using a portable consumer device. A transaction request is then generated for an issuer and sent to the issuer for authorization. The issuer and the bank associated with the web site may be the same entity. The issuer then sends a response indicating whether the transaction request is approved or declined. Remittance information for a biller is generated if the transaction is approved. The remittance information is then forwarded to the operator of the on-line banking bill payment web site for forwarding to a user of the portable consumer device. Additionally, the remittance information is sent to an acquirer or cash management bank, which can forward the information to the biller associated with the bill payment request.

In one embodiment, a system for processing a request for on-line banking payment of a bill is provided. The system comprises: a first module configured to receive an on-line banking bill payment request for paying a bill using an account associated with a portable consumer device, wherein the bill payment request is originated by an entity different from a biller associated with the bill; and a second module configured to interact with an issuer of the portable consumer device and an acquirer to process the on-line banking bill payment request to satisfy payment of the bill using the account associated with the portable consumer device.

In another embodiment, a method for processing on-line banking bill payment requests is provided. The method comprises: receiving an on-line banking bill payment request for paying a bill using an account associated with a portable consumer device, wherein the on-line banking bill payment request is originated by an entity different from a biller associated with the bill; obtaining an approval or denial from an issuer of the portable consumer device with respect to the on-line banking bill payment request; and if the issuer approves the on-line banking bill payment request, settling the on-line banking bill payment request between the issuer and an acquirer.

In yet another embodiment, a system for processing on-line banking bill payment requests is provided. The system comprises: a plurality of bill payment processors, each bill payment processor configured to issue on-line banking bill payment requests, wherein a bill payment request is for paying a bill using an account associated with a portable consumer device; and a transaction processor configured to receive corresponding bill payment requests from the plurality of bill payment processors, the transaction processor further configured to, for each bill payment request, contact an issuer of the portable consumer device associated with that bill payment request to request approval, wherein forwarding of the bill payment requests from the plurality of bill payment processors to the transaction processor is not originated by billers associated with the bills.

In another embodiment, a method for processing on-line banking bill payment requests is provided. The method comprises: receiving an on-line banking bill payment request for paying a bill associated with the biller using an account associated with a portable consumer device, wherein the on-line banking bill payment request is originated by an issuer;

obtaining an approval or denial from the issuer of the portable consumer device with respect to the on-line banking bill payment request; and if the issuer approves the on-line banking bill payment request, settling the on-line banking bill payment request between the issuer and an acquirer.

A further understanding of the nature and the advantages of the inventions disclosed herein may be realized by reference of the remaining portions of the specification and the attached drawings.

DETAILED DESCRIPTION OF THE INVENTION

Figure 1:
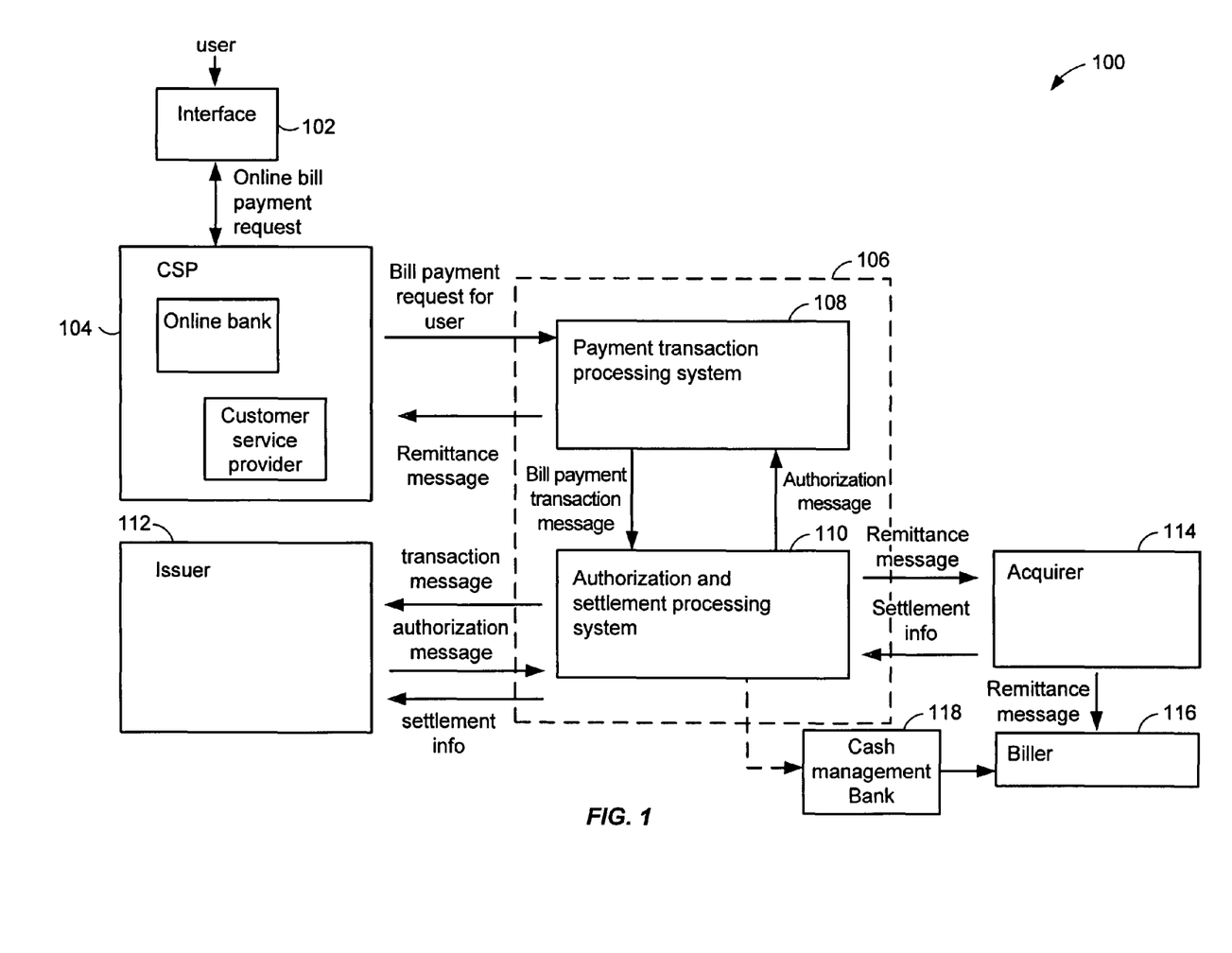
FIG. 1 depicts a system for processing on-line banking bill payment transactions according to one embodiment of the present invention.

The present invention in the form of one or more exemplary embodiments will now be described. FIG. 1 depicts a system 100 for processing on-line banking bill payment transactions according to one embodiment of the present invention. A transaction processor 106 interacts with a number of different parties involved in a transaction including, but not limited to, a customer service provider (CSP) 104, an issuer 112, an acquirer 114, and a biller 116. A user may interact with an interface 102 to submit an on-line banking bill payment request to CSP 104.

Embodiments of the present invention allow an entity other than biller 116 to originate a portable consumer device payment transaction. Conventionally, biller 116 would originate or initiate the portable consumer device payment transaction, which would be processed using an issuer and acquirer. However, transactions may be initiated by an entity other than biller 116 using embodiments of the present invention. For example, the portable consumer device payment transaction may be originated by issuer 112. These transactions may be processed using issuer 112 and acquirer 114 as a portable consumer device transaction.

While conventional portable consumer device payment transactions were originated by a biller 116, embodiments of the present invention allow portable consumer device payment transactions to be originated from an on-line banking bill payment site. In one embodiment, when the issuer and bank for the on-line banking bill payment site are the same, the portable consumer device payment transaction is originated from the issuer. This provides the advantage of allowing a user to originate portable consumer device payment transactions from the on-line banking bill payment site. A user does not have to go to each biller's web site to pay bills using the portable consumer device. Also, the portable consumer device payment transaction is processed by transaction processor 106 as a portable consumer device payment transaction and not in transactions that mimic the portable consumer device payment transaction, such as using a cash advance to a user's account and then an ACH payment to the biller. Using the cash advance and ACH payment may cause confusion with the user and also cause extra fees to be incurred (extra fees may apply for a cash advance).

Portable consumer devices according to embodiments of the invention may be in any suitable form. For example, the portable consumer devices can be hand-held and compact so that they can fit into a consumer's wallet and/or pocket (e.g., pocket-sized). For example, the portable consumer devices may include smart cards, ordinary credit or debit cards (with a magnetic strip and without a microprocessor), a keychain device (such as the Speedpass™ commercially available from Exxon-Mobil Corp.), etc. Other examples of portable consumer devices include cellular phones, personal digital assistants (PDAs), pagers, portable consumer devices, security cards, access cards, smart media, transponders, and the like. The portable consumer devices can also be debit devices (e.g., a debit card), credit devices (e.g., a credit card), or stored value devices (e.g., a stored value card).

The user may be any person or entity that desires to pay a bill. Interface 102 may be any interface that can communicate with CSP 104. For example, interface 102 may be a web browser on a computing device that is connected to the Internet. A user may log on to a web site that allows the user to pay a bill on-line.

CSP 104 is an entity that provides services that allow a user to pay a bill on-line. For example, CSP 104 may include an on-line bank or a third party service provider. In one example, an on-line bank, such as Bank of America, may have a web site that is serviced by a third party service provider. The provider processes the on-line banking bill payment requests for the bank. In another example, the on-line bank may perform the functions of CSP 104.

CSP 104 is responsible for receiving on-line banking bill payment requests from a user and forwarding them to transaction processor 106. In one embodiment, CSP 104 is configured to receive on-line banking bill payment requests from users. Each user specifies a portable consumer device to be used in connection with the bill payment request.

CSP 104 is also configured to update and track participating billers. For example, the participating billers 116 may accept different portable consumer devices from different issuers. CSP 104 tracks which billers 116 accept which portable consumer devices.

Issuer 112 may be any business entity. Typically, issuer 112 is a financial institution, such as a bank. Issuer 112 issues portable consumer devices to the user that may be used to pay a bill on-line. Issuer 112 may be the same entity as the bank associated with the on-line bank web site.

Acquirer 114 is configured to handle the payment of the bill to biller 116. Upon receiving information that a bill payment has been approved, acquirer 114 is responsible for settling the bill with biller 116.

An "acquirer" is typically a business entity, e.g., a commercial bank that has a business relationship with a particular merchant or biller. An "issuer" is typically a business entity (e.g., a bank) which issues a portable consumer device such as a credit or debit card to a consumer. Some entities such as American Express perform both issuer and acquirer functions. Embodiments of the invention encompass such single entity issuer-acquirers.

Biller 116 should also be able to accept portable consumer device payments. Additionally, biller 116 may be configured to accept portable consumer device payments through on-line payment requests. However, because transaction processor 106 processes an on-line banking bill payment request the same way that payment transactions are processed with biller 116, biller 116 may just be configured to process portable consumer device transactions.

Transaction processor 106 is configured to process on-line banking bill payment requests that use a portable consumer device. In one embodiment, transaction processor 106 includes a payment transaction processing system (PTPS) 108 and an authorization and settlement processing system (ASPS) 110. It will be recognized that, in alternative embodiments, the functions described for PTPS 108 and ASPS 110 may be performed by either system and that the functions may be performed by any number of processors. It should be further noted that, in alternative embodiments, PTPS 108 and ASPS 110 may be combined.

PTPS 108 is configured to communicate with CSP 104 and ASPS 110. PTPS 108 is configured to process bill payment requests received from CSP 104 and generate remittance information for each processed request. In one embodiment, PTPS 108 may include a payment processing system configured to handle on-line transactions, such as a system known as Visa commerce operated by Visa. It will be recognized that a system such as Visa operated by Visa Commerce may include any network to communicate information as described.

The payment processing system may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system may use any suitable wired or wireless network, including the Internet.

ASPS 110 is configured to handle authorization and settlement of transactions represented by the bill payment requests. For example, ASPS 110 may include any network configured to process portable consumer device authorization and settlement transactions, such as a system known as VisaNet operated by Visa. In one embodiment, transaction requests that are received from PTPS 108 are processed according to how any portable consumer device transaction would be processed. For example, an on-line banking bill payment using a portable consumer device may be processed with the same messages as a portable consumer device transaction at a point of sale device. ASPS 110 interacts with issuer 112 and acquirer 114 to handle the authorization and settlement of an on-line banking bill payment transaction for a portable consumer device. Additionally, authorization information is sent to PTPS 108 for forwarding to CSP 104.

In one embodiment, system 100 operates in the following manner. It will be understood that variations in operation may be appreciated and that steps may be performed in a different order than that described. Generally, the user may log on to an on-line web site for a bank through interface 102. A user may need to enter login identifiers, such as an account number, and/or a PIN to gain access to the web site.

The user may then enter an on-line banking bill payment request. A user may also request that payment be made using a portable consumer device. A bill payment request is an indication that a bill for a biller 116 should be paid. The bill payment request may include an amount to be paid, information needed to pay the bill using a portable consumer device, such as an account number for the portable consumer device and an expiration date, and any other information that may be needed. The bill payment request may then be submitted or routed to CSP 104. For example, a user may specify a portable consumer device issued by a bank in the bill payment request using an interface 102 provided by that bank. Thus, issuer 112 may be the online bank. It should be noted that the portable consumer device need not be linked to any account maintained by CSP 104. As long as the user has the right to use the services provided by CSP 104 to issue the bill payment request, the user can specify any portable consumer device to be used in connection with the bill payment request. For example, a user can use a portable consumer device that is not issued by a bank to make an on-line payment via that bank's web site, as long as the user has the right to use services on that web site.

When an on-line banking bill payment request is received, CSP 104 is configured to process the request. CSP 104 processes the request and forwards the request to PTPS 108.

PTPS 108 is configured to receive the bill payment request from CSP 104 and to generate a transaction message for the bill payment request. In one embodiment, PTPS 108 authenticates that CSP 104 is authorized to send a bill payment request for the user. Then, PTPS 108 may use information in the bill payment request to generate a bill payment transaction message. For example, different CSPs 104 may send requests in different formats. Thus, PTPS 108 may receive on-line banking bill payment requests from several CSPs 104 that are in different formats. PTPS 108 is configured to generate a transaction message in a format that can be processed by ASPS 110.

In one embodiment, PTPS 108 submits a transaction message that is in the same format as transaction messages for portable consumer device transactions other than on-line banking bill payment requests. In one embodiment, the bill payment transaction message may be a VisaNet 0200 message. Thus, ASPS 110 may treat the transaction message for the bill payment request as if the transaction message was initiated by a biller 116. Thus, even though an on-line banking bill payment request is to be processed, ASPS 110 does not need to process the transaction message differently than any other portable consumer device transaction, such as a portable consumer device transaction at a point of sale device. Thus, an entity such as Visa does not need to significantly modify its processing system, such as VisaNet, to process on-line banking bill payment requests.

ASPS 110 receives the bill payment transaction message from PTPS 108 and forwards the transaction message to issuer 112. Issuer 112 is configured to authorize or decline the transaction.

Issuer 112 then reviews the transaction message and determines whether to approve or decline the transaction. Issuer 112 generates a response or authorization message that indicates whether the request is approved or declined and sends the response message to ASPS 110. In one embodiment, the response message may be a VisaNet 0210 message.

In other embodiments, a pre-authorized transaction may be used. For example, an issuer and on-line bank may communicate and the on-line bank may obtain preauthorization for a transaction. For example, the preauthorization may authorize transactions for a user that are under a certain dollar amount. In this case, issuer 112 does not need to be contacted after the on-line banking bill payment request is initiated.

ASPS 110 determines whether the response message indicates that the transaction was authorized or declined. If the bill payment request is declined, ASPS 110 sends a message indicating that the transaction was declined to PTPS 108. The message is then forwarded to CSP 104, which then may record that the request was declined and also may forward it to the user.

If the bill payment request was authorized, ASPS 110 generates remittance information for the transaction. Remittance information may be any information that is needed to settle the bill payment request. For example, information that may be needed includes information needed by biller 116 and acquirer 114 to settle the transaction, etc. ASPS 110 then forwards remittance information to PTPS 108.

PTPS 108 receives the remittance information from ASPS 110 and forwards the information in a remittance message to CSP 104. In a typical portable consumer device transaction, remittance information is only sent to an acquirer 114. However, because CSP 104 is processing an on-line banking bill payment request, the remittance information is provided so that CSP 104 may complete the request in its records. For example, the remittance information is stored in records for CSP 104. Also, because a request for paying a bill is submitted on-line, a user would prefer to know if the request is approved (such that the user can know that the bill was paid). Thus, the remittance information is provided to inform the user if the request to pay the bill has been approved.

ASPS 110 also sends remittance information to acquirer 114. In one embodiment, a TC33 message is sent. The TC33 message includes remittance information needed by biller 116 in order to reconcile the user's account.

Acquirer 114 receives a remittance message with the remittance information from ASPS 110 and forwards it to a biller 116 associated with the payment request. Biller 116 can then reconcile its accounts to indicate the payment for the bill associated with the bill payment request. Accordingly, biller 116 applies the amount indicated in the remittance message to the user's account. Acquirer 114 is then responsible for paying the amount to biller 116.

In another embodiment, ASPS 110 may send a message to a cash management bank (CMB) 118 that is configured to settle the transaction with biller 116. CMB 118 may be a system that manages accounts for biller 116. When CMB 118 receives the remittance information, CMB 118 deposits money into an account for biller 116. Also, the user's account at biller 116 may also be debited to reflect the payment. If CMB 118 is used, acquirer 114 may still process the transaction but may not need to settle the transaction with biller 116.

Acquirer 114 then sends settlement information to ASPS 110. ASPS 110 may then settle the transaction with issuer 112. The issuer 112 may then bill the user, such as by sending a portable consumer device statement with the amount associated with the bill payment request at a later time. This may be performed in real-time or at certain intervals, such as in a batch process (e.g., at the end of the day).

Accordingly, an on-line banking bill payment request using a portable consumer device has been enabled using transaction processor 106. PTPS 108 is configured to create messages that are used by ASPS 110 in processing portable consumer device transactions. ASPS 110 processes the portable consumer device transaction and provides remittance information for the transaction back to PTPS 108. PTPS 108 can then inform a CSP 104 whether the transaction was approved or declined.

The payment request is thus originated by an entity other than biller 116. For example, when the online bank and issuer are the same entity, the payment request is originated by the issuer. Thus, transaction processor 106 is configured to receive a bill payment request and initiate an issuer originated payment for the request. This offers the advantage of allowing users to use portable consumer devices to initiate on-line banking bill payment requests for billers. By originating the request, the payment transaction is generated by the issuer and processed by transaction processor 106. Accordingly, transaction processor 106 contacts the issuer for approval of the request without receiving a payment transaction request from biller 116. After approval is received, transaction processor 106 cooperates with issuer 112 and acquirer 114 to settle the bill with biller 116.

The above process is different from using a portable consumer device at a biller's web site. Embodiments of the present invention push a payment to the biller 116 without initiation by the biller. Also, the payment is processed by issuer 112 and acquirer 114. This processes a transaction using systems that may be used if the transaction is initiated by a biller 116. However, the transaction is originated by a party other than biller 116. Accordingly, system 100 provides an efficient way to process online bill payment requests using a portable consumer device. The transaction is processed as a portable consumer device transaction and not using an ACH transaction or other non-portable consumer device transactions.

Figure 2:
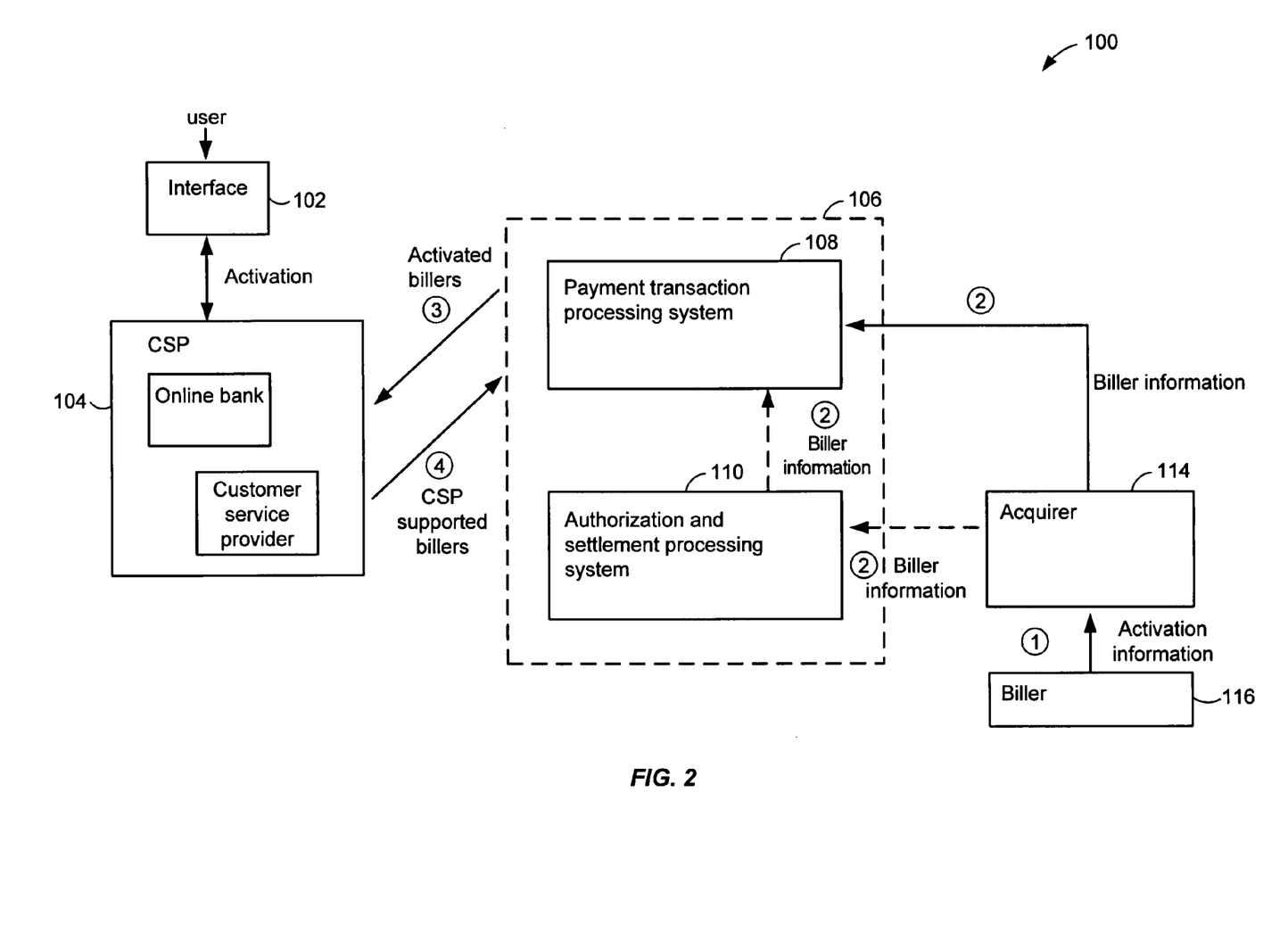
FIG. 2 depicts a process flow for activating a biller and/or a user for an on-line banking bill payment transaction according to one embodiment of the present invention.

FIG. 2 depicts a process flow for activating a biller 116 and/or a user for an on-line banking bill payment transaction according to one embodiment of the present invention. Although the steps will be described in a certain order, it will be recognized that steps may be performed in another order than that described.

In order to activate on-line banking bill payment, biller 116 sends activation information to acquirer 114. The activation information may include information needed by CSP 104 to allow bills from biller 116 to be paid by users using an on-line banking bill payment service. Acquirer 114 may then submit the biller information to PTPS 108 and/or ASPS 110. In one embodiment, the biller information may be submitted to PTPS 108 by batch. Thus, activation information from multiple billers 116 may be received and sent in a batch to PTPS 108. Alternatively, in substantially real-time, acquirer 114 may send biller information to ASPS 110. The information is then forwarded to PTPS 108.

PTPS 108 may then send the activation information for billers in substantially real-time or in batch to CSP 104. In one embodiment, PTPS 108 may send information for all activated billers that has been received. In another embodiment, only activation information for billers that have been activated since the last batch update may be sent.

CSP 104 receives the activation information for the activated billers and for each biller not yet supported, a biller profile is set up. CSP 104 sends information for the billers that are set up to PTPS 108. The information may be a biller identifier that is used to identify a biller that is associated with a bill payment. PTPS 108 then populates a universal biller file with the supported billers. The universal biller file is a file that indicates which billers are activated by different CSPs 104. For example, Bank of America may be associated with certain billers and Wells Fargo may be associated with another set of billers. Thus, the universal biller file is used to determine which billers can be paid through which on-line banking sites.

After the billers 116 have been activated by CSP 104, a user may access an on-line banking bill payment system through interface 102. The user can then activate a portable consumer device as a funding source for on-line banking bill payment requests. The user may activate the funding source by entering an account number, such as an account number for a Visa credit card or debit card. Other information, such as an expiration date, a home address, or phone number may also be required.

Once a user has activated the portable consumer device, the user may submit on-line banking bill payment requests for any billers that have been activated by the process described above.

Figure 3:
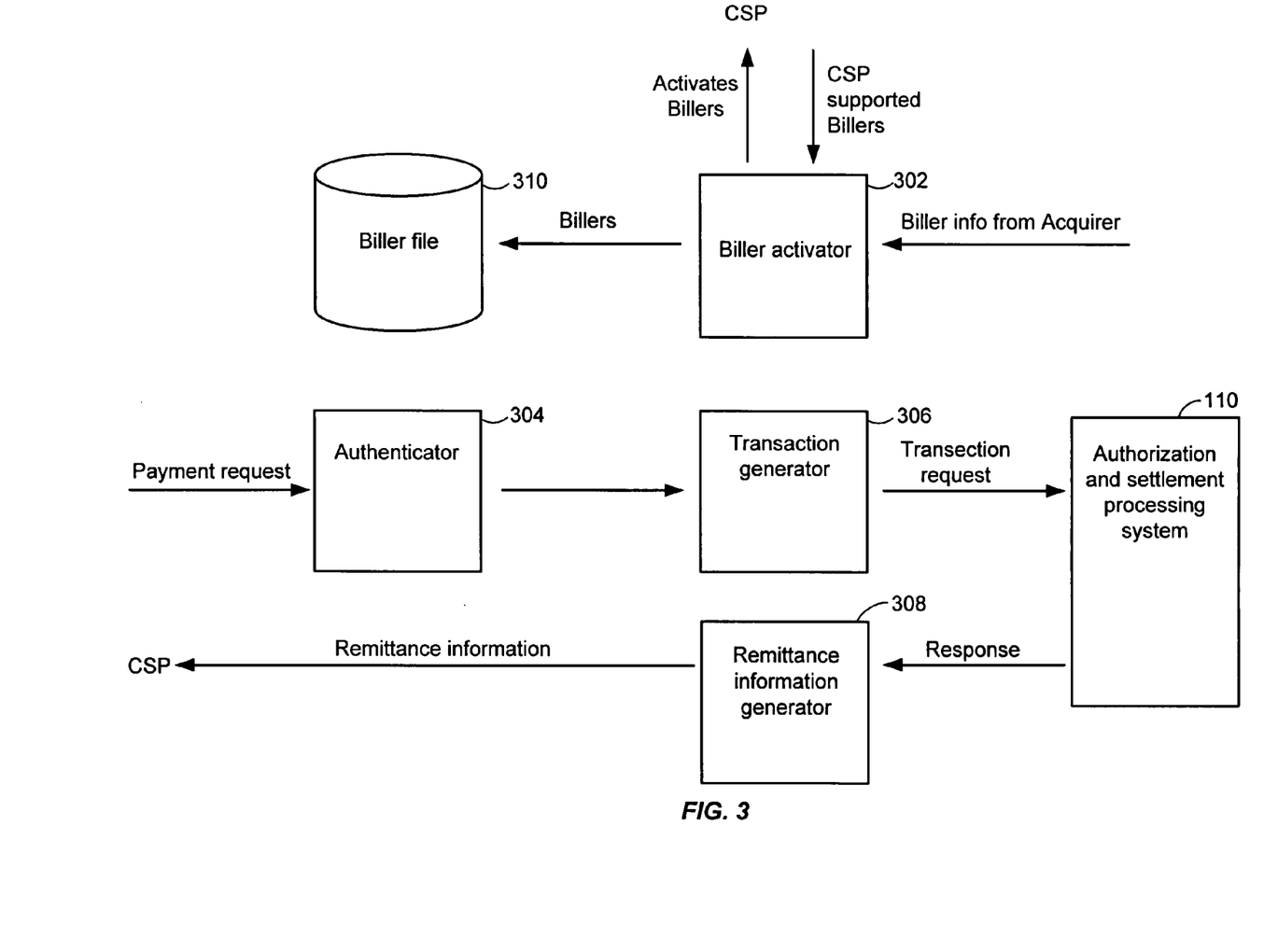
FIG. 3 depicts a payment transaction processing system according to one embodiment of the present invention.

FIG. 3 depicts of PTPS 108 according to one embodiment of the present invention. PTPS 108 includes a biller activator 302, an authenticator 304, a transaction generator 306, a remittance information generator 308, and a biller file 310.

Biller activator 302 is configured to receive biller information from acquirer 114. Biller activator 302 then communicates with CSP 104 to send information for activated billers and also to receive information for supported billers from CSP 104. The information for supported billers received from CSP 104 is then stored in biller file 310. The information stored in biller file 310 may include information that is needed to generate a transaction message when an on-line banking bill payment request is received from CSP 104.

When a payment request is received, authenticator 304 is configured to authenticate the request. In one embodiment, authenticator 304 may authenticate CSP 104 and also authenticate that a biller 116 is supported in biller file 310. If the biller 116 is supported, the payment request is sent to transaction generator 306.

Transaction generator 306 is configured to generate a transaction message that is compatible with ASPS 110. In one embodiment, transaction generator 306 may use biller information in biller file 310 to generate the transaction message.

ASPS 110 processes the transaction message and sends the transaction message to an issuer 112, who determines whether the corresponding a transaction should be approved or declined. ASPS 110 sends a response from issuer 112 to remittance information generator 308. If the response indicates that the transaction is approved, remittance information for the transaction is generated and sent to CSP 104. If the response indicates that the transaction is declined, a message indicating that the bill payment request was declined is generated and sent to CSP 104.

In one example, a user may submit an on-line banking bill payment request using a Visa portable consumer device for the amount of $50.00. The payment request is for payment of an electric bill for an electric company. The payment request is received from CSP 104 at transaction processor 106. A transaction message is generated and sent to an issuer 112, which authorizes the transaction. Issuer 112 may be the bank associated with the on-line bank. Remittance information is then generated indicating that a payment of $50.00 to the electric company has been approved. A remittance message is then sent to CSP 104 and acquirer 114.

CSP 104 then records the remittance information and also sends a confirmation to the user that a payment of $50.00 has been received and approved.

The remittance message is then sent to the electric company by acquirer 114. The electric company applies the payment to the bill as indicated by the remittance information and the bill is considered paid.

Issuer 112 then bills the user of the Visa portable consumer device through known methods. The user may then receive a statement for the payment of the electric company bill from biller 116.

It should be understood that the transaction processor 106 is able to handle multiple CSPs 104, issuers 112 and acquirers 114. Furthermore, each CSP 104 and acquirer 114 is able to handle multiple billers 116.

Embodiments of the present invention may be implemented in the form of control logic in software or hardware or a combination of both. The control logic may be stored in an information storage medium as a plurality of instructions adapted to direct an information-processing device to perform a set of steps disclosed in embodiments of the present invention. Examples of information storage media include random access memory (RAM), read only memory (ROM), persistent (non-volatile) storage, hard disk drives, floppy disk drives along with associated removable media, Compact Disc Read Only Memory (CD-ROMs), removable media cartridges, and other computer readable media. Examples of information-processing devices include personal computers, portable computers, workstations, network computers, mainframes, kiosks, or any other data processing systems.

The above description is illustrative but not restrictive. Many variations of embodiments of the present invention will become apparent to those skilled in the art upon review of the disclosure. Based on the disclosure and teachings provided herein, a person of ordinary skill in the art will appreciate other ways and/or methods to implement embodiments of the present invention. The scope of the invention should, therefore, be determined not with reference to the above description, but instead should be determined with reference to the pending claims along with their full scope of equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An issuer originated bill payment system for processing a request for on-line banking payment of a bill associated with a biller, the system comprising:

a payment transaction processing system configured to receive an on-line banking bill payment request for paying a bill using an account associated with a portable consumer device, wherein the bill payment request is originated by an entity different from the biller associated with the bill; and an authorization and settlement processing system configured to interact with an issuer of the portable consumer device and an acquirer to process the on-line banking bill payment request to satisfy payment of the bill using the account associated with the portable consumer device, wherein the payment transaction processing system and the authorization and settlement processing system are between the issuer and the acquirer and are configured to use the bill payment request to generate a transaction message that is sent to the issuer before communicating with the acquirer associated with the biller, wherein the issuer is configured to approve or decline the transaction message for the on-line banking bill payment request before the issuer originated bill payment system communicates with the acquirer and send a response message indicating whether the transaction message was approved or denied to the authorization and settlement processing system, wherein the authorization and settlement processing system is configured to generate remittance information for the biller when the transaction message is approved, wherein the authorization and settlement processing system is configured to send the remittance information to the acquirer, wherein the acquirer communicates the remittance information to the biller associated with the on-line banking bill payment request, and wherein the remittance information is used to settle the bill, wherein the issuer is the entity that originates the bill payment request, and the bill payment request is originated after a user of the portable consumer device contacts the issuer, and wherein the issuer is a bank that issues the portable consumer device, and wherein the acquirer is a bank that has a business relationship with the biller.

2. The system of claim 1, wherein the authorization and settlement processing system is configured to send the remittance information to the payment transaction processing system, and the payment transaction processing system is configured to send the remittance information to a bill processor.

3. The system of claim 2, wherein the bill processor communicates the remittance information to the user.

4. The system of claim 1, wherein the authorization and settlement processing system receives settlement information for the transaction message from the acquirer and is configured to send the settlement information to the issuer.

5. The system of claim 1, wherein the authorization and settlement processing system is configured to send the remittance information to a cash management bank configured to settle the transaction with the biller.

6. The system of claim 1 wherein the payment transaction processing system comprises a biller file, wherein the biller file comprises supported biller information.

7. The system of 1 wherein the payment transaction processing system further comprises a biller activator, an authenticator, a transaction generator, and a remittance information generator.

8. The system of claim 7 wherein the payment transaction processing system is configured to receive on-line banking bill payment requests in different formats.

9. The system of claim 7 wherein the transaction message is in the same format as transaction messages for portable consumer device transactions other than on-line banking bill payment requests.

10. The system of claim 9 wherein the portable consumer device is a debit card.

11. A method for processing on-line banking bill payment requests, the method comprising:
   receiving an on-line banking bill payment request for paying a bill using an account associated with a portable consumer device at a transaction processor, wherein the on-line banking bill payment request is originated by an entity different from a biller associated with the bill;
   generating a bill payment transaction message using the bill payment request in the transaction processor, which is between the issuer of the portable consumer device and an acquirer associated with the biller, before communicating with the acquirer associated with the biller;
   forwarding the bill payment transaction message to the issuer of the portable consumer device before communicating with the acquirer associated with the biller;
   obtaining an approval or denial from the issuer with respect to the on-line banking bill payment request before communicating with the acquirer associated with the biller;
   generating remittance information for the biller associated with the on-line banking bill payment request upon the on-line banking bill payment request being approved; and
   settling the on-line banking bill payment request between the issuer and the acquirer,
   wherein the issuer is the entity that originates the bill payment request, and the bill payment request is originated after a user of the portable consumer device contacts the issuer,
   wherein the issuer is a bank that issues the portable consumer device, and wherein the acquirer is a bank that has a business relationship with the biller.

12. The method of claim 11, further comprising sending the remittance information to a bill processor.

13. The method of claim 12, wherein the bill processor communicates the remittance information to a user of the portable consumer device.

14. The method of claim 11, further comprising sending the remittance information to a cash management bank configured to settle the transaction with the biller.

15. The method of claim 11, further comprising sending the remittance information to the acquirer associated with the biller, wherein the acquirer communicates the remittance information to the biller associated with the on-line banking bill payment request, wherein the remittance information is used to settle the bill using the portable consumer device.

16. The method of claim 11, wherein the transaction processor is a first transaction processor, and wherein the method further comprises:
   sending the on-line banking bill payment request to a second transaction processor configured to interact with the issuer and the acquirer to process the on-line banking bill payment request.

17. The method of claim 16, wherein the first transaction processor formats the on-line banking bill payment request such that it is compatible with a format used by the second transaction processor.

18. The method of claim 11, further comprising receiving activation information for the biller, the activation information needed to enable on-line banking bill payment requests associated with the biller to be processed.

19. The system of claim 11, wherein obtaining approval from the issuer comprises obtaining pre-approval from the issuer.

20. The method of claim 11 wherein the portable consumer device is a credit, debit, or stored value card.

21. The method of claim 20 wherein the transaction processor is further configured to process credit and debit card transactions.

22. The method of claim 11 wherein the transaction processor is further configured to process credit and debit card transactions.

23. A method for processing on-line banking bill payment requests, the method comprising:
   receiving an on-line banking bill payment request for paying a bill associated with a biller using an account associated with a portable consumer device at a transaction processor, wherein the on-line banking bill payment request is originated by an issuer of the portable consumer device;
   generating a transaction message using the bill payment request in the transaction processor that is between the issuer of the portable consumer device and an acquirer associated with the biller, before communicating with the acquirer associated with the biller;
   sending the transaction message to the issuer of the portable consumer device;
   obtaining an approval or denial from the issuer of the portable consumer device with respect to the on-line banking bill payment request before communicating with an acquirer associated with the biller;
   generating remittance information for the biller associated with the on-line banking bill payment request upon the on-line banking bill payment request being approved; and
   settling the on-line banking bill payment request between the issuer and the acquirer,
   wherein the issuer is a bank that issues the portable consumer device, and wherein the acquirer is a bank that has a business relationship with the biller.

24. The method of claim 23, further comprising sending a confirmation to a user associated with the portable consumer device, wherein the confirmation states that the on-line bill payment request has been received and approved by the issuer.

* * * * *